United States Patent [19]

Mayer

[11] 4,305,691

[45] Dec. 15, 1981

[54] TRAY FEEDER

[75] Inventor: Jack J. Mayer, Cheney, Wash.

[73] Assignee: R. A. Pearson Company, Spokane, Wash.

[21] Appl. No.: 97,160

[22] Filed: Nov. 26, 1979

[51] Int. Cl.³ .......................... B65G 59/04; B65H 3/08
[52] U.S. Cl. .................................... 414/128; 221/211;
221/261; 271/107; 271/185; 414/330
[58] Field of Search ....................... 414/125, 128, 330;
221/211, 261; 271/30 A, 90, 100, 107, 185

[56] References Cited

U.S. PATENT DOCUMENTS

| | | | |
|---|---|---|---|
| 2,653,743 | 9/1953 | Stenger | 221/211 X |
| 3,108,714 | 10/1963 | O'Brien | 221/211 |
| 3,407,963 | 10/1968 | Daily | 414/128 X |
| 3,606,960 | 9/1971 | Butterworth | 221/211 |
| 3,750,931 | 8/1973 | Dick | 221/211 X |
| 3,907,161 | 9/1975 | Martin | 221/211 |

Primary Examiner—F. J. Bartuska
Attorney, Agent, or Firm—Wells, St. John & Roberts

[57] ABSTRACT

A machine for feeding individual flexible trays from an inclined nested stack to a conveyor or other appropriate surface below the stack. Vacuum heads are mounted to arms that pivot about a horizontal axis spaced from an upper transverse edge of an inclined hopper holding the nested stack. The lower end of the inclined hopper is open for engagement by vacuum heads at the ends of the pivoted arms. The vacuum heads are pivoted by the arms to engage successive trays adjacent a lower transverse edge of the hopper. The arms are then pivoted back with the vacuum heads adhered to a tray, stripping the tray from the stack and pivoting it to a substantially horizontal position where it is released to fall to a surface below. A guide may be employed to direct movement of the tray downwardly.

9 Claims, 9 Drawing Figures

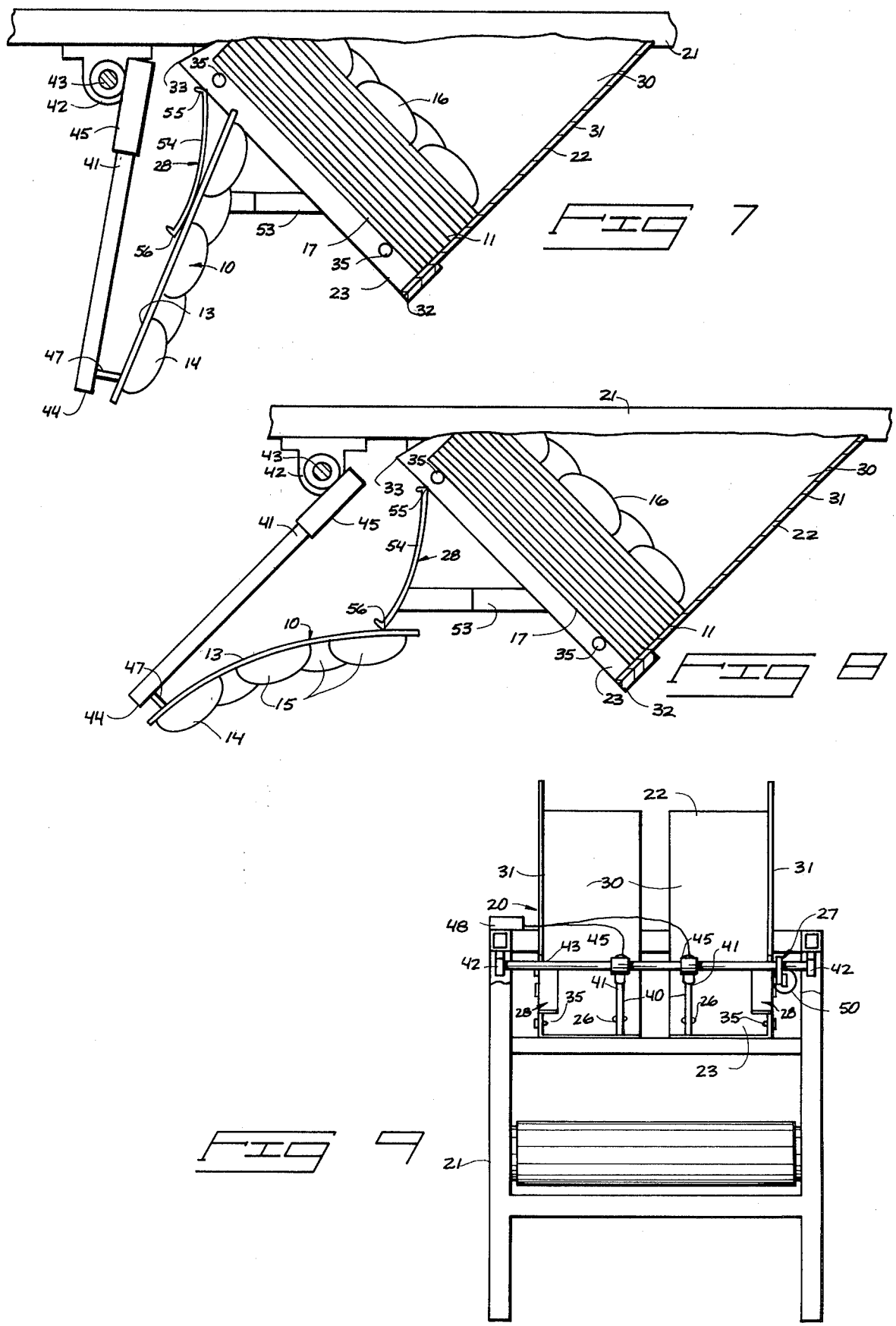

TRAY FEEDER

BACKGROUND OF THE INVENTION

The present invention is related to apparatus for feeding individual packing trays from nested stacks.

The packaging industry frequently makes use of layer dividing trays constructed of molded paper pulp or plastic resin. There are several forms of such trays. Efforts have been made to mechanically feed the individual trays to packing stations where the may be mechanically or manually inserted into a case. Such efforts to this point have been unsuccessful.

One difficulty arises due to the rough texture and molded nature often encountered of the trays themselves. The indentations formed within the nested trays tend to adhere together and form vacuum pockets between one another. Also, the edges of the trays tear easily and the trays themselves will readily bend or tear if mishandled.

Attempts to remove trays vertically downward from a stack by applying vacuum force to the underside of each tray have been made by the applicant. However, some trays do not have adequate marginal flanges to support the stack in a vertical hopper. Others have lower surfaces that are too rough for proper vacuum attachment.

U.S. Pat. No. 3,907,161 to Eberhard Martin discloses an apparatus for denesting stacked packaging trays of a specific form from a vertically nested stack. The apparatus utilizes a vertically movable mandrel and vacuum head arrangement whereby the periphery of the individual trays is reduced, disengaging its edges from retaining projections at the lower end of the hopper. The retracted peripheral edge clears the retaining edges and allows the tray to be withdrawn downwardly from the hopper while the next successive tray with expanded edges engages the hopper projections. The device also includes provisions for de-nesting trays from an inclined hopper. Here, the trays are turned from a "face down" to a "face up" position on a conveyor by a rotatable suction mandrel that is indexed inwardly to grasp and reduce the peripheral circumference of the individual tray, pull it outwardly of the nested stack, and pivot it to a horizontal orientation. At that point, the tray is released and falls into a guide mechanism. A rearward edge of the falling tray strikes against a stationary abutment to flip the opposite side of the tray over onto the working flight of the conveyor.

U.S. Pat. No. 3,606,960 to L. J. Butterworth discloses an egg carton dispensing machine making use of an arcuate hopper for nested egg cartons. A pivoted suction head is provided at one side of the bottom hopper end. The suction head is pivoted to engage the convex surfaces of individual egg-receiving indentations. Suction is applied and successive cartons are removed as the suction head arm is pivoted outwardly. The pivot arms are relatively short so that the suction head can engage the carton at a point directly adjacent the pivot axes for the suction heads. Therefore, the tendency is for the cartons to fall onto a conveyor below the hopper in an upwardly open configuration, ready to receive eggs. The suction head merely allows controlled fall of the individual cartons from the nested stack.

The present device makes use of a support arm and suction heads that are pivoted adjacent one transverse side of the nested stack. The suction heads engage the individual trays adjacent an opposite side of the stack. The tray is pulled from the stack and is gradually pivoted from one side of the stack to the other. This reduces the vacuum drag from the one tray to the next. The trays are inverted from the original nested position as the arms are pivoted through an arc of approximately 90° before the trays are released. The guide mechanism assures that the tray will fall vertically onto a working flight of the conveyor below.

BRIEF DESCRIPTION OF THE DRAWINGS

FIGS. 4 through 8 are enlarged schematic views illustrating operation of the present invention; and FIG. 9 is an end view of the machine as seen from the left in FIG. 3.

DETAILED DESCRIPTION OF A PREFERRED EMBODIMENT

Figure 1:
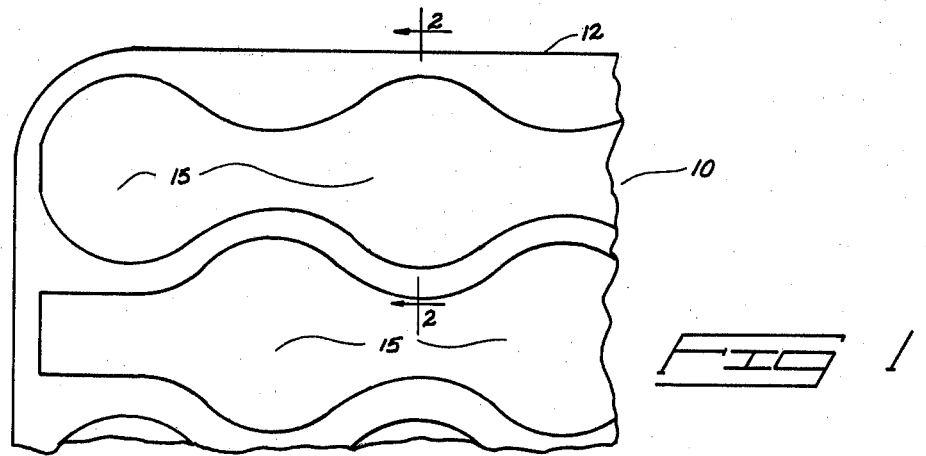
FIG. 1 is a fragmentary plan view of a tray that is exemplary of the type used with the present invention.
Figure 2:
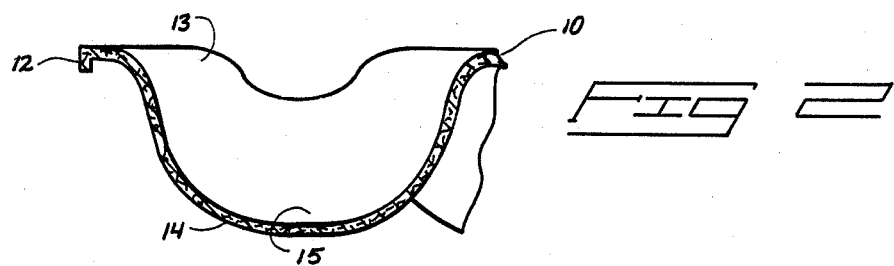
FIG. 2 is a fragmentary sectional view of a portion of a tray shown in FIG. 1.

FIGS. 1 and 2 of the drawings show portions of a typical molded fruit packing tray 10 which may be nested together with other trays to form a stack 11 (FIGS. 4 through 8). The individual tray 10 includes transverse edges 12 that extend along the length dimension of its rectangular configuration. Each tray 10 includes both an upper surface 13 and a bottom surface 14. Indentations 15 are formed successively about the upper surface 13. These indentations 15 interfit within one another in the nested stack to form substantial vacuum closures that resist removal of individual trays from the stack.

The stack 11 can vary considerably in height and might include a top 16 (FIGS. 4 through 8) and a bottom 17. The bottom 17 of the stack is arranged such that the upper surfaces 13 of the individual trays are directed downward. Further, for descriptive purposes, the stack 11 shall be referred to as having a longitudinal dimension extending along the height of the stack from the top 16 to the bottom 17.

Figure 3:
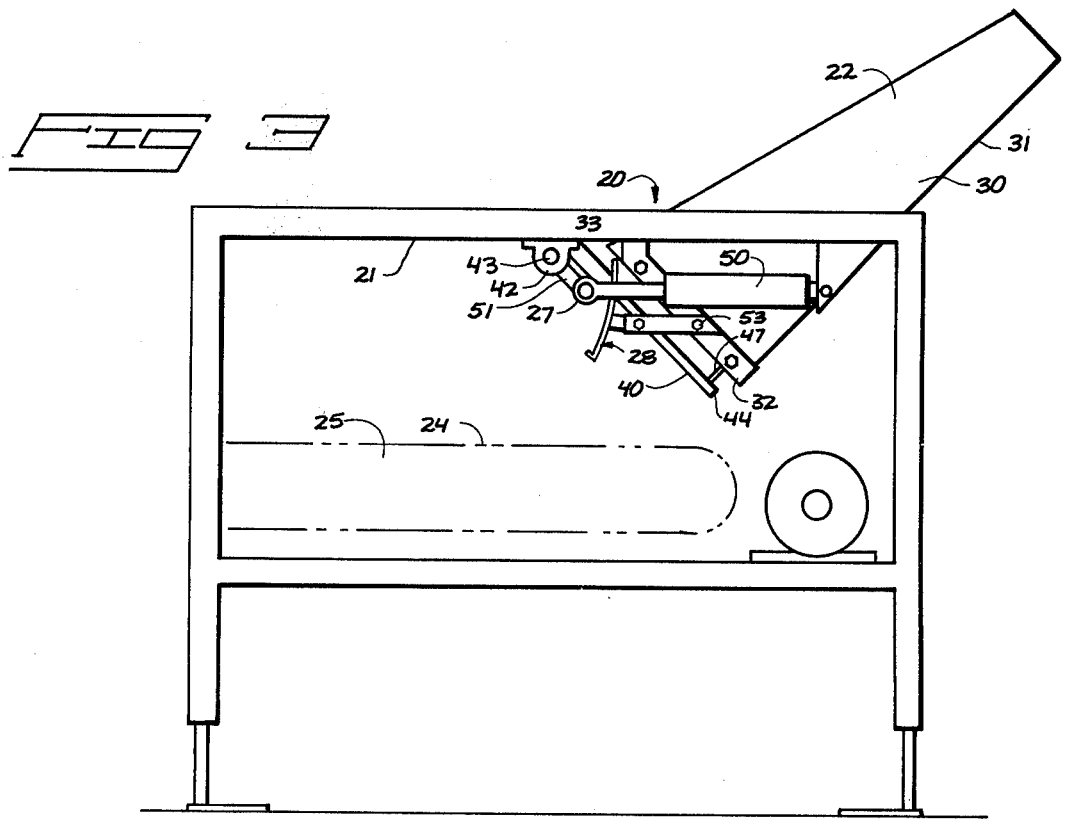
FIG. 3 is a side elevation view of a machine illustrating principal components of the present invention.
Figure 4:
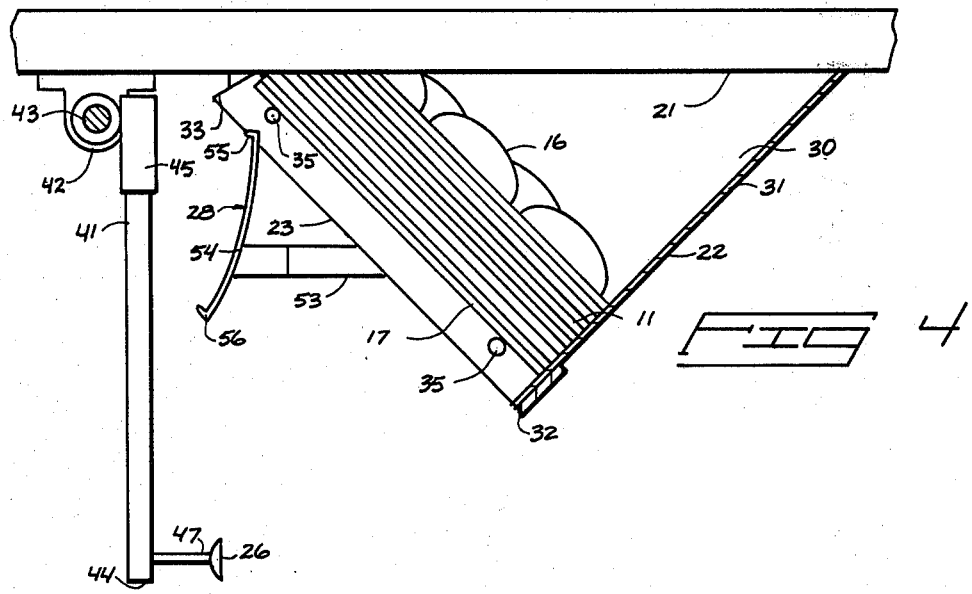

The present machine is shown generally at 20 in FIGS. 3 and 9. It has been designed specifically for removing and depositing successive trays 10 from the nested stack 11. The machine basically includes a rigid framework 21 mounting a fixed inclined hopper 22. The hopper 22 slidably receives the tray stack 11. The hopper 22 includes an open bottom end 23 that is located upwardly adjacent to the working flight 24 (FIG. 3) of a horizontally disposed conveyor 25.

Vacuum heads 26 are pivoted through a means 27 to successively engage the bottom tray of the stack, pull it down and outwardly from the hopper, and drop it onto the conveyor 25. The succession of operative steps are shown in schematic FIGS. 4 through 8. A guide means 28 may be provided for the purpose of deflecting the individual trays downwardly to assure proper orientation of the trays as they are received on conveyor 25.

The hopper 22 is shown in substantial detail by FIGS. 3 through 9. As shown, the hopper is elongated and is oriented at an incline of approximately 45°. The hopper includes upright end walls 30 interconnected by an inclined side wall 31. The bottom end of the hopper is partially defined by a lower transverse edge 32 of the opening 23 and a parallel spaced upper transverse edge 33. The lower and upper transverse edges 32 and 33 are adjacent the bottom 17 of the nested stack 11.

The nested stack 11 is supported within hopper 22 by means of tray release pins 35 (FIGS. 4 through 8). The pins 35 preferably extend through the upright end walls 30 of the hopper directly adjacent the open end thereof. The pins are also spaced in pairs closely adjacent to the edges 32 and 33. Alternatively, it is conceivable that pins 35 could extend through the inclined side wall 31 and through the framework along the upper edge 33 to engage the successive trays. The function of pins 35, regardless of their orientation, is to releasably support the nested stack and to enable single trays 10 to be withdrawn from it.

An alternative provision may be to place freely rotatable rollers (not shown) transversely across the top hopper edge 33, with the release pins 35 remaining at the lower edge. The rollers at the top edge could provide support to the stack while enabling relatively free movement of successive trays 10 as they are detached from the pins 35 and moved toward a release position. Such an arrangement could be preferred when fragile trays are to be handled.

The vacuum heads 26 are mounted to elongated vacuum head arms 40. The vacuum head arms 40 include inward ends 41 mounted by bearings 42 to a transverse pivot shaft 43. The arms 40 will therefore pivot relative to the inclined hopper and stack about the axis defined by the shaft 43.

The vacuum head arms 40 extend outwardly from the ends 41 to remote, outer ends 44. The radial distance from the pivot axis to the outer arm end 44 is only slightly less than the distance from the axis of the lower transverse edge of opening 32. Therefore, pivotal movement of the arms about the transverse pivot axis will bring the outer ends 44 into close proximity with the lower transverse edge 32.

The radial dimension from the pivot axis of shaft 43 to the outer arm ends 44 can be selectively changed by adjustment sleeves 45. The sleeves 45 are fixed to the pivot shafts 43 for rotation therewith about the transverse pivot axis.

The sleeves 45 slidably receive the vacuum head arms 40. An appropriate locking device, such as a set screw or cotter pin (not shown), can interconnect the sleeves and arms to permit adjustable positioning of the arms relative to the pivot axis. Such adjustment may be required when trays 10 of different dimensions are to be de-nested. The sleeves 45 can be similarly mounted to the shaft to allow lateral spacing adjustment between the vacuum heads.

The vacuum heads 26 are simply comprised of soft, pliable cups mounted to hollow shanks 47. The shanks 47 project from the outward arm ends 44 in the direction of the stack 11. The shanks 47 are hollow to transmit vacuumm force from a vacuum or suction supply 48 as diagrammatically indicated in FIG. 9. The application of vacuum pressure at the cups can be timed in coordination with pivotal movement of the arms so that they will adhere to the bottom tray of the stack when the arms are pivoted to a first position (FIG. 5) and release as the arms reach a second position (FIG. 8).

FIGS. 3 and 9 also illustrate the means 27 for pivoting the vacuum head arms 40 and vacuum heads 26 between the first position (FIG. 5) and the second position (FIG. 8). Means 27 comprises a cylinder assembly 50 interconnecting the framework 21 and a crank arm 51. The crank arm 51 is pivotably mounted to the cylinder assembly 50 at one end and is fixed to the pivot shaft 43 at its remaining end. Extension and contraction of the cylinder assembly 50 will therefore cause pivotal movement of the shaft 43 and attached elements.

The stroke of the cylinder assembly 50 is controlled to cause pivotal movement of the shaft through an angle of approximately 90°. At full retraction, the shaft and attached elements assume the first position shown in FIG. 5. The opposite extreme of the cylinder stroke is illustrated in FIG. 8. Angular pivotal movement of 90° is sufficient to bring a single tray from the inclined stack to a substantially horizontal orientation.

The guide means 28 is best shown in FIGS. 4 through 8. Guide means 28 functions to deflect successive trays engaged by the vacuum head 26 downwardly and to guide the successive trays vertically downward on release at the second position (FIG. 8).

The guide means 28 is situated elevationally below the hopper 22 and is adjustably positioned by substantially horizontal mounting arms 53. Each mounting arm 53 supports an arcuate plate 54. The plates 54 each include horizontal top edges 55 and bottom edges 56. The edges 55 and 56 are interconnected by a convex surface facing the bottom tray of the stack. The surface is utilized to engage and guide successive trays downwardly toward more direct engagement with the bottom edge 56 (FIG. 7).

The bottom edge 56 of the arcuate plate 54 functions as a deflector (FIG. 8). The bottom edge 56 engages and, preferably, produces a slight bow across the individual trays. When the vacuum force is released, the tray will spring slightly in a substantially vertical downward direction toward the working flight of conveyor 25.

The guide means 28 is preferably used on all forms of the present invention. However, some particular tray configurations may not require guidance. Others may require only the use of a short transverse rod at the position of the bottom edge 56. In any case, if the plate 54 or rod (not shown) is used, the deflector or edge 56 should be positioned closer to the upper transverse edge 33 than to the lower edge 32. Tearing of the trays could result if the deflector were placed closer to the lower transverse edge 32.

Operation

To initiate operation of the present invention, appropriate driving mechanisms (not shown) for the conveyor 25 are activated and a stack of trays 10 are placed into the hopper. The trays are loaded with their upper surfaces 13 facing downward. The properly loaded hopper will support the bottom 17 of the nested stack with all pins 35 engaging the bottom tray. Manual or automatic actuation of the vacuum supply 48 and pivot means 27 can then proceed.

Figure 5:
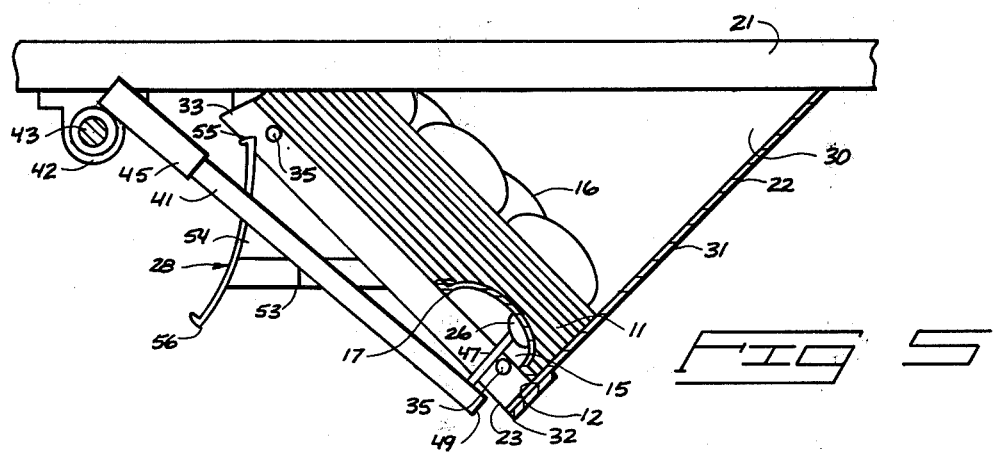

The cylinder 50 extends upon actuation of the pivot means 27. Extension of the cylinder assembly causes pivotal movement of the vacuum head arms 40 and vacuum heads from the inoperative position (FIG. 4) to the operative first position (FIG. 5). Here, the pliable vacuum heads 26 come into direct engagement with the bottom tray of the stack. The vacuum heads preferably engage the tray within indentations 15 that are directly adjacent to the lower transverse hopper edge 32. Suction produced through the vacuum supply 48 causes the vacuum heads to adhere to the tray.

An appropriate conventional switching device, such as a switch and an actuator mechanism (not shown)

positioned on the pivoting shaft may produce a signal denoting the position of the vacuum heads and cause extension of the cylinder 50. The extending cylinder 50 moves the vacuum arm and head, along with the attached tray from the FIG. 5 position to the FIG. 8 position. Preferably, the vacuum head arms move through an angle of 90°.

Figure 6:
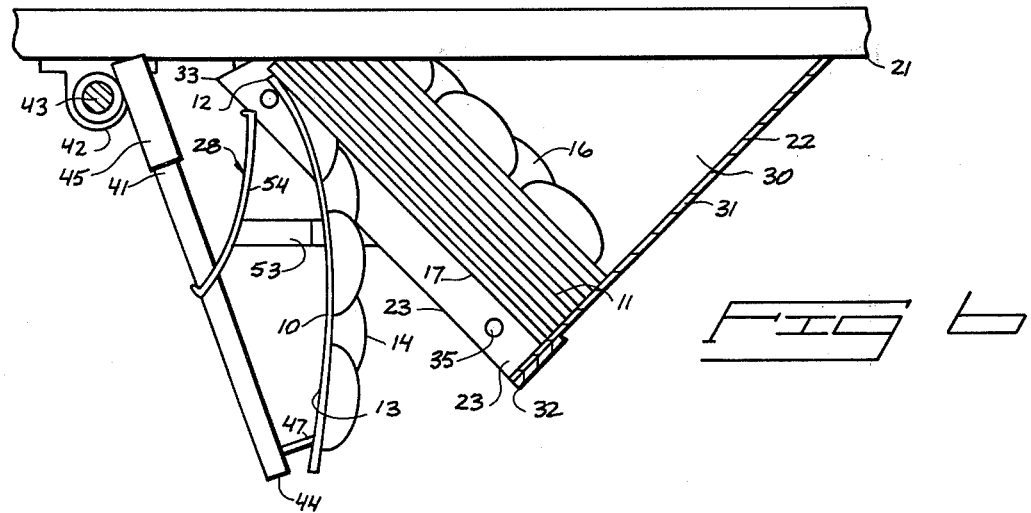

The end edges of the tray snap over the lower pair of pins 35 as the vacuum heads and arms are pivoted away from the stack (FIG. 6). The side of the tray adjacent the upper edge 33 will slide slightly downwardly over the upper pins 35 and subsequently will slide free or will snap over the upper pins 35, leaving the tray supported solely by the moving vacuum head. The tray will again straighten after release from the upper pins and assume the position shown in FIG. 7. At this point, the tray upper surface may engage the arcuate surface of the guide means 28. The stationary guide means allows free sliding motion of the tray over its arcuate surface as the vacuum head and pivot arm pivot on toward the second position. The bottom edge 56 of the guide means 28 as shown in FIG. 8 functions as a deflector, causing the tray to bow transversely and upwardly. Finally, as the arm and vacuum heads reach the second position, appropriate switching mechanisms will function to cut off the application of vacuum force. The tray will then fall or spring downward from the deflector to engagement with the working flight of conveyor 25. The slight deflection will cause the springing movement which assures substantially vertical movement of the tray onto the conveyor surface below.

This completes a single operational cycle of the present device which can be repeated continuously for each tray of the nested stack.

The above description and drawings are given by way of example to set forth a preferred form of the present invention. Other forms are conceivable and fall within the scope of the invention as claimed below.

What is claimed is:

1. A machine for delivering successive individual flexible trays from a nested stack, comprising:
   a framework;
   inclined hopper means on the framework having an open bottom end with a transverse upper edge and a transverse lower edge for slidably receiving a nested stack of trays and successively releasing individual trays through said open bottom end;
   a vacuum head arm pivotally mounted to the framework about a horizontal axis adjacent said transverse upper edge of the hopper means;
   means for pivoting the vacuum head arm about the horizontal axis between a first position extending under the hopper means to said transverse lower edge and a second position outwardly clear of the hopper alongside said transverse upper edge;
   vacuum head means mounted to the vacuum head arm for: (a) engaging the bottom tray of a nested stack at a location adjacent the transverse lower edge of the hopper means as the vacuum head arm is pivoted to its first position; and (b) releasing an engaged tray when the vacuum head arm is pivoted to its second position; and
   guide means below the hopper means and adjacent the transverse upper edge thereof, said guide means being positioned in the path of trays being moved by the vacuum head and arm to the second position for engaging and guiding the trays to substantially horizontal inverted orientation at the second position of the vacuum head arm in response to movement of the vacuum head arm through an angle about said axis from the bottom end of said hopper means.

2. The machine as defined by claim 1 wherein the hopper means includes tray engaging pins projecting inwardly at its open bottom end to frictionally engage and releasably support a nested stack of trays from the bottom tray of the stack.

3. The machine as defined by claim 2 wherein the trays and hopper means are rectangular in cross section and wherein the pins are located adjacent the four corners of the rectangular cross section, one pair of pins being aligned along an axis parallel to the horizontal pivot axis of the vacuum head arm and adjacent the lower transverse edge of the hopper means and a remaining pair located adjacent the upper transverse edge thereof.

4. The machine as defined by claim 1 wherein the means for pivoting the vacuum head arm is comprised of:
   a crank arm mounted to the vacuum head arm at the horizontal axis thereof; and
   cylinder means connected between the framework and crank arm for pivoting the crank arm and vacuum head arm about the horizontal axis.

5. The machine as defined by claim 1 further comprising:
   conveyor means on the framework below the hopper means, said conveyor means having a working flight for receiving successive individual trays released by the vacuum head means and for moving the released trays away from the hopper means.

6. The machine as set out by claim 1 wherein the angular movement of the vacuum head arm about said horizontal axis while moving from the first to the second positions is approximately 90°.

7. The machine as defined by claim 1 wherein the guide means is comprised of an arcuate plate, having a convex surface facing the open bottom end of the hopper means and located in an upright orientation between the horizontal pivot axis of the vacuum head arm and the transverse lower edge of said hopper means.

8. The machine as defined by claim 7 wherein the arcuate plate includes a top edge located adjacent the upper transverse edge of the hopper means and a downwardly disposed bottom edge.

9. The machine as defined by claim 1 wherein the guide means is comprised of a deflector mounted to the frame and projecting into the paths of successive trays being moved from the first to the second position at a location below the open bottom end and adjacent the pivot axis for the vacuum head arm.

* * * * *